United States Patent
Fudaba et al.

(10) Patent No.: US 11,760,885 B2
(45) Date of Patent: Sep. 19, 2023

(54) ALUMINUM FLAKE PIGMENT AND METHOD OF PRODUCING SAME

(71) Applicant: TOYO ALUMINIUM KABUSHIKI KAISHA, Osaka (JP)

(72) Inventors: Tetsuya Fudaba, Osaka (JP); Koji Yoshida, Osaka (JP); Katsuhiro Kuroda, Osaka (JP); Hiroki Tamaura, Osaka (JP)

(73) Assignee: TOYO ALUMINIUM KABUSHIKI KAISHA, Osaka (JP)

( * ) Notice: Subject to any disclaimer, the term of this patent is extended or adjusted under 35 U.S.C. 154(b) by 98 days.

(21) Appl. No.: 16/756,196

(22) PCT Filed: Sep. 7, 2018

(86) PCT No.: PCT/JP2018/033234
§ 371 (c)(1),
(2) Date: Apr. 15, 2020

(87) PCT Pub. No.: WO2019/077904
PCT Pub. Date: Apr. 25, 2019

(65) Prior Publication Data
US 2021/0189142 A1 Jun. 24, 2021

(30) Foreign Application Priority Data
Oct. 16, 2017 (JP) .............................. JP2017-200302

(51) Int. Cl.
*C09C 1/64* (2006.01)
*B22F 1/00* (2022.01)
(Continued)

(52) U.S. Cl.
CPC ................ *C09C 1/64* (2013.01); *B22F 1/052* (2022.01); *B22F 1/068* (2022.01); *B22F 9/04* (2013.01);
(Continued)

(58) Field of Classification Search
CPC ........ B22F 1/052; B22F 2998/10; B22F 9/04; B22F 9/082; B22F 1/068; B22F 2009/043;
(Continued)

(56) References Cited

U.S. PATENT DOCUMENTS 4,976,777 A * 12/1990 Ozawa ...................... C09C 1/62
75/255
2004/0151940 A1 8/2004 Takano et al.
(Continued)

FOREIGN PATENT DOCUMENTS

| CN | 1518581 A | 8/2004 |
| CN | 1701101 A | 11/2005 |

(Continued)

OTHER PUBLICATIONS

Extended European Search Report for European Application No. 18868919.4, dated Jul. 9, 2021.
(Continued)

*Primary Examiner* — Shuangyi Abu Ali
(74) *Attorney, Agent, or Firm* — Birch, Stewart, Kolasch & Birch, LLP

(57) ABSTRACT

An aluminum flake pigment is an aluminum flake pigment including aluminum flakes, wherein the aluminum flakes include small-size aluminum flakes each having a particle size of less than or equal to 1 μm, and in a microscope image when the aluminum flakes are observed using a scanning electron microscope, a ratio of the number of the small-size aluminum flakes is less than or equal to 35% with respect to the number of a whole of the aluminum flakes.

4 Claims, 3 Drawing Sheets

(51) Int. Cl.
  *B22F 9/04* (2006.01)
  *B22F 9/08* (2006.01)
  *B22F 1/068* (2022.01)
  *B22F 1/052* (2022.01)
  *B82Y 40/00* (2011.01)

(52) U.S. Cl.
  CPC ........ *B22F 9/082* (2013.01); *B22F 2301/052* (2013.01); *B82Y 40/00* (2013.01); *C01P 2004/03* (2013.01); *C01P 2004/61* (2013.01); *C01P 2006/60* (2013.01)

(58) Field of Classification Search
  CPC ............... B22F 2301/052; B82Y 40/00; C01P 2004/03; C01P 2004/51; C01P 2004/61; C01P 2004/62; C01P 2006/60; C01P 2006/62; C09C 1/64
  See application file for complete search history.

(56) References Cited

U.S. PATENT DOCUMENTS

| | | |
|---|---|---|
| 2006/0058419 A1 | 3/2006 | Nagano |
| 2009/0274735 A1 | 11/2009 | Wakamiya |
| 2010/0194836 A1 | 8/2010 | Prölss et al. |
| 2010/0258034 A1 | 10/2010 | Reisacher et al. |
| 2017/0001242 A1 | 1/2017 | Nakao |

FOREIGN PATENT DOCUMENTS

| | | |
|---|---|---|
| CN | 101743284 A | 6/2010 |
| CN | 101896257 A | 11/2010 |
| CN | 104761927 A | 7/2015 |
| CN | 106029266 A | 10/2016 |
| JP | 2-73872 A | 3/1990 |
| JP | 8-170034 A | 7/1996 |
| JP | 9-323064 A | 12/1997 |
| JP | 10-1625 A | 1/1998 |
| JP | 11-152423 A | 6/1999 |
| JP | 2000-273349 A | 10/2000 |
| JP | 2000-273350 A | 10/2000 |
| JP | 2000273349 A * | 10/2000 |
| JP | 2002-544023 A | 12/2002 |
| JP | 2003-96334 A | 4/2003 |
| JP | 2009-504909 A | 2/2009 |
| KR | 10-2008-0033510 A | 4/2008 |
| WO | WO 00/69647 A1 | 11/2000 |
| WO | WO 2007/020364 A1 | 2/2007 |

OTHER PUBLICATIONS

Chinese Office Action and Search Report for Chinese Application No. 201880066967.6, dated Oct. 9, 2021, with English translation.

Shunyang et al., "Chemical Formulation and Process Manual," Shanghai Science and Technology Literature Press, Jan. 31, 2003, p. 793.

* cited by examiner

… (1)

ALUMINUM FLAKE PIGMENT AND METHOD OF PRODUCING SAME

TECHNICAL FIELD

The present invention relates to an aluminum flake pigment and a method of producing the aluminum flake pigment.

BACKGROUND ART

An aluminum flake pigment has been used in various fields as a metallic pigment included in a paint composition, an ink composition, a resin composition, or the like. Generally, a metallic feel of a painted film is recognized visually by a combination of luminance, lightness, glittering, and the like. Conventionally, a painted film with a high luminance has been desired.

For example, Japanese Patent Laying-Open No. 11-152423 (Patent Literature 1) proposes to provide uniform particle sizes of aluminum flakes in order to obtain an aluminum flake pigment having a high luminance. Specifically, the aluminum flake pigment having a high luminance is obtained by obtaining aluminum flakes having a uniformity index of $n \geq 2.4$. This uniformity index n is a numerical value obtained from a Rosin-Rammler diagram. It is indicated that as the value of uniformity index n is larger, a particle size distribution is smaller. Accordingly, uniformity index n can be used as an index for evaluating whether or not particle sizes of particles are uniform.

A method of calculating uniformity index n of aluminum flakes is as follows, for example. That is, a laser diffraction type particle size distribution measurement device is used to find a volume-based particle size distribution of the aluminum flakes, and a cumulative distribution for each particle size based on this particle size distribution is plotted on a Rosin-Rammler diagram. By connecting a line between plotted points, a straight line is obtained on the Rosin-Rammler diagram. Next, an inclination of this straight line is found and is accordingly calculated as uniformity index n.

CITATION LIST

Patent Literature

PTL 1: Japanese Patent Laying-Open No. 11-152423

SUMMARY OF INVENTION

Technical Problem

Due to demands for new designs, a metallic pigment that provides a more luxurious metallic feel has been required for an aluminum flake pigment. Hence, a new aluminum flake pigment having a higher luminance than that of the above-described aluminum flake pigment having a uniformity index of $n \geq 2.4$ has been required.

The present invention has been made in view of the above-described actual situation, and has an object to provide: an aluminum flake pigment having a higher luminance as a metallic pigment that provides a luxurious metallic feel; and a method of producing such an aluminum flake pigment.

Solution to Problem

The present inventors have obtained the following knowledge: when small-size aluminum flakes each having a particle size of less than or equal to 1 µm are adhered to aluminum flakes each having a larger particle size, a particle size distribution of the aluminum flakes is calculated using a laser diffraction type particle size distribution measurement device without detecting the small-size aluminum flakes. In this case, the particle size distribution obtained by the laser diffraction type particle size distribution measurement device and uniformity index n obtained based on this particle size distribution do not represent actual numerical values thereof. The measured aluminum flakes may have non-uniform particle sizes.

Based on such knowledge, the present inventors have repeated visual observation on aluminum flakes for aluminum flake pigments using an electron microscope or the like. As a result, the present inventors have found that when there are a small number of small-size aluminum flakes in a microscope image, aluminum flakes having actually uniform particle sizes tend to be obtained, thus arriving at aluminum flakes having actually uniform particle sizes. Even when an aluminum flake pigment including the aluminum flakes having actually uniform particle sizes has a uniformity index n, which is obtained using a laser diffraction type particle size distribution measurement device, comparable to that in a conventional aluminum flake pigment, the luminance thereof is high. Specifically, the present invention has the following configurations.

(1) The present invention is directed to an aluminum flake pigment including aluminum flakes, wherein the aluminum flakes include small-size aluminum flakes each having a particle size of less than or equal to 1 µm, and in a microscope image when the aluminum flakes are observed using a scanning electron microscope, a ratio of the number of the small-size aluminum flakes is less than or equal to 35% with respect to the number of a whole of the aluminum flakes.

(2) Preferably in the microscope image, the ratio of the number of the small-size aluminum flakes is less than or equal to 25% with respect to the number of the whole of the aluminum flakes.

(3) Preferably, when a particle size distribution of the aluminum flakes is measured using a laser diffraction type particle size distribution measurement device, a uniformity index n based on a Rosin-Rammler diagram obtained from the particle size distribution is more than or equal to 2.5.

(4) The present invention is directed to a method of producing the above-described aluminum flake pigment, the method including: obtaining atomized particles from pure aluminum or an aluminum alloy using an atomizing method; obtaining aluminum particles by classifying the atomized particles; and obtaining aluminum flakes by pulverizing the aluminum particles.

Advantageous Effects of Invention

According to the description above, there can be provided: an aluminum flake pigment having a higher luminance as a metallic pigment that provides a luxurious metallic feel; and a method of producing such an aluminum flake pigment.

DESCRIPTION OF EMBODIMENTS

Hereinafter, embodiments of the present invention will be described more in detail. Here, in the present specification, the expression "A to B" represents a range of lower to upper limits (i.e., more than or equal to A and less than or equal to B). When no unit is indicated for A and a unit is indicated only for B, the unit of A is the same as the unit of B.

<<Aluminum Flake Pigment>>

Figure 1:
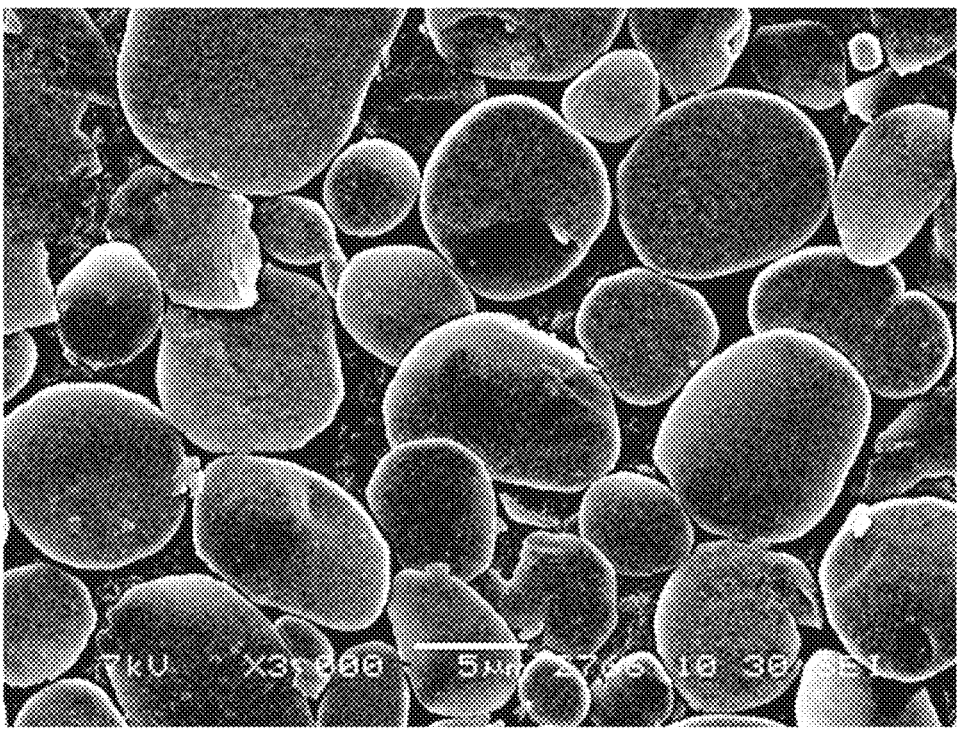
FIG. 1 shows, as an illustration, a photograph showing a scanning electron microscope image of aluminum flakes included in an aluminum flake pigment of an Example 2.

The present invention relates to an aluminum flake pigment including aluminum flakes. The aluminum flakes include small-size aluminum flakes each having a particle size of less than or equal to 1 µm. For example, as shown in FIG. 1, in a microscope image when the aluminum flakes are observed using a scanning electron microscope, a ratio of the number of the small-size aluminum flakes is less than or equal to 35% with respect to the number of a whole of the aluminum flakes. Accordingly, an aluminum flake pigment having a higher luminance can be attained as a metallic pigment that provides a luxurious metallic feel.

In the present specification, the aluminum flake pigment that provides a "luxurious metallic feel" refers to an aluminum flake pigment that exhibits an $L^*_{15}$ of more than or equal to 140 and an FI value of more than or equal to 13. $L^*_{15}$ serves as an index for evaluating a luminance as described below.

<Aluminum Flakes>

The aluminum flakes include the small-size aluminum flakes each having a particle size of less than or equal to 1 µm as described above. Here, in the present specification, the "particle size" refers to the maximum length between two flat surfaces of a flat flake-shaped particle of an aluminum flake, the two flat surfaces being substantially in parallel with each other with a certain distance therebetween. The certain distance therebetween corresponds to the thickness of the flat flake-shaped particle. Therefore, for example, as shown in the microscope image of FIG. 2, a small-size aluminum flake having a particle size of less than or equal to 1 µm is included in a circle having a diameter of 1 µm. The number of aluminum flakes included in circles each having a diameter of 1 µm is counted as the number of the small-size aluminum flakes as described below, thereby calculating a ratio of the number of the small-size aluminum flakes with respect to the number of the whole of the aluminum flakes.

It can be said that the lower limit value of the particle size of the small-size aluminum flake is, but should not be particularly limited to, a size in detection limit of a scanning electron microscope at a magnification of 3000×, such as 100 nm.

(Ratio of Number of Small-Size Aluminum Flakes)

As described above, in the microscope image when the aluminum flakes are observed using a scanning electron microscope, the ratio of the number of the small-size aluminum flakes is less than or equal to 35% with respect to the number of the whole of the aluminum flakes. Particularly, in the microscope image, the ratio of the number of the small-size aluminum flakes is preferably less than or equal to 25% with respect to the number of the whole of the aluminum flakes. When the ratio is more than 35% with respect to the number of the whole of the aluminum flakes, the ratio of the number of the small-size aluminum flakes becomes too large, with the result that a desired high luminance may be unable to be obtained. The minimum value of the ratio should not be particularly limited, and is 0% with respect to the number of the whole of the aluminum flakes, for example. That is, in the present specification, the "inclusion of small-size aluminum flakes each having a particle size of less than or equal to 1 µm" means to ideally include an embodiment in which the ratio of the small-size aluminum flakes is 0% with respect to the whole of the aluminum flakes. When no small-size aluminum flake is included in the aluminum flakes, the above-described ratio indicates a minimum value (0%). Therefore, for example, the technical scope of the present invention includes an embodiment in which the ratio of the small-size aluminum flakes is 0.01% with respect to the whole of the aluminum flakes.

When the ratio of the number of the small-size aluminum flakes is more than 35% with respect to the number of the whole of the aluminum flakes, a desired high luminance is not obtained presumably due to the following reasons although details of a cause thereof are unknown. That is, it is considered that the particles of the small-size aluminum flakes are adhered to the surfaces of the aluminum flakes each having a particle size of more than 1 µm to deteriorate smoothness of the surfaces of the aluminum flakes each having a particle size of more than 1 µm. This causes irregular reflection, thus resulting in a decreased luminance. Further, when aluminum particles serving as a source material of the aluminum flakes are pulverized, the aluminum particles each having a particle size of less than or equal to 1 µm are involved in flaking of the aluminum particles each having a particle size of more than 1 µm. As a result, due to the aluminum particles each having a particle size of less than or equal to 1 µm, indentations such as depressions are formed in the surfaces of the aluminum flakes each having a particle size of more than 1 µm. Accordingly, the smoothness of each of the surfaces of the aluminum flakes each having a particle size of more than 1 µm is deteriorated to cause irregular reflection, thus presumably resulting in a decreased luminance.

Figure 2:
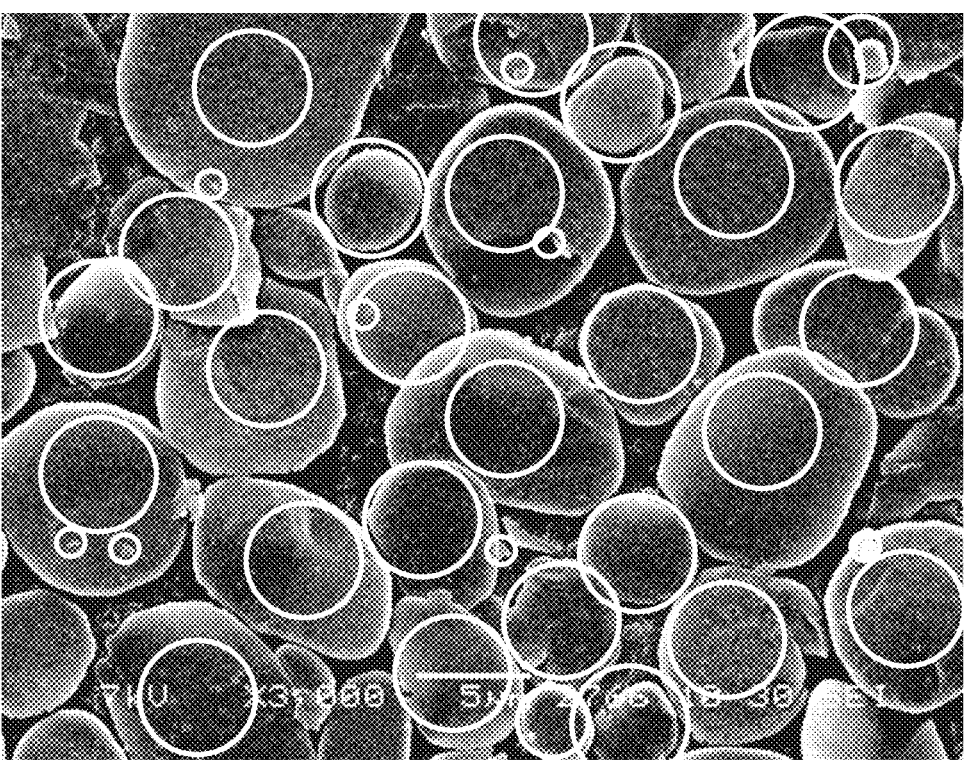
FIG. 2 shows, as an illustration, a photograph showing a scanning electron microscope image to explain a method of calculating, from the whole of the aluminum flakes by way of visual observation, a ratio of the number of small-size aluminum flakes included in the aluminum flake pigment of Example 2.

With reference to FIG. 2, the following describes a method of calculating the ratio of the number of the small-size aluminum flakes with respect to the number of the whole of the aluminum flakes. The smallest circle shown in FIG. 2 is a circle having a diameter of 1 µm, a circle having a medium size is a circle having a diameter of 3 µm, and the largest circle is a circle having a diameter of 5 µm.

First, the aluminum flakes obtained by pulverizing the aluminum particles serving as the source material are cleaned using an organic solvent such as hexane, and are dispersed in an alcohol (for example, isopropyl alcohol), thereby obtaining a fluid dispersion. Next, this fluid dispersion is introduced into water, and the surface of the water and the flat surfaces of the aluminum flakes are made parallel to each other so as to avoid the aluminum flakes from overlapping with each other, thereby aligning orientations of the aluminum flakes. Finally, the aluminum flakes with the aligned orientations are removed from the surface of the water using a predetermined tools to avoid them from overlapping with each other, and are then placed on a sample table of a scanning electron microscope (for example, trademark: "JSM-6380A" provided by JEOL DATUM).

Images of 20 visual fields in the aluminum flakes placed on the sample table are arbitrarily captured at a magnification of 3000× using the above-described scanning electron microscope so as to avoid overlapping of the images, thereby obtaining 20 microscope images. Next, the aluminum flakes in each of these microscope images are counted in the following manner.

As shown in FIG. 2, the aluminum flakes that can be included in circles each having a diameter of 1 μm are first specified by visual observation of the microscope image, the circles each having a diameter of 1 μm are overlaid on the aluminum flakes, and then the circles are counted. This operation is repeated until no aluminum flake that can be included in such a circle having a diameter of 1 μm remains in the microscope image (i.e., the above operation is repeated until all the circles each having a diameter of 1 μm and each overlaid on the microscope image are counted). When objects included in such circles each having a diameter of 1 μm are indistinguishable as to whether the objects are aluminum flakes, introduced matters such as dust and dirt, or scratches on the surfaces of the aluminum flakes in the visual observation, the objects are all counted as aluminum flakes.

Next, by the same operation as in the case of the aluminum flakes that can be included in the circles each having a diameter of 1 μm, circles each having a diameter of 3 μm are overlaid on aluminum flakes that can be included in such circles each having a diameter of 3 μm, and are counted. In doing so, the aluminum flakes (small-size aluminum flakes) on which the circles each having a diameter of 1 μm are overlaid are not counted as the aluminum flakes that can be included in the circles each having a diameter of 3 μm (i.e., the circles each having a diameter of 3 μm are not overlaid thereon).

Further, by the same operation as in the case of the aluminum flakes that can be included in the circles each having a diameter of 1 μm, circles each having a diameter of 5 μm are overlaid on aluminum flakes that can be included in such circles each having a diameter of 5 μm, and are counted. Also in this case, the aluminum flakes (small-size aluminum flakes) on which the circles each having a diameter of 1 μm are overlaid and the aluminum flakes on which the circles each having a diameter of 3 μm are overlaid are not counted. Finally, each of aluminum flakes on which no circles are overlaid on this occasion in the microscope image has a diameter of more than 5 μm. On such aluminum flakes, circles each having a diameter of 5 μm are overlaid, and are counted.

Here, in the visual observation for the aluminum flakes with the scanning electron microscope, there are aluminum flakes that are not wholly included in the frame of the image and that have portions out of the frame of the image because the aluminum flakes are located at end portions of the microscope image. Only when it is determined that each of such aluminum flakes has a particle size larger than the circle's diameter of 1 μm, 3 μm, or 5 μm, a circle having a corresponding diameter is overlaid thereon as an aluminum flake having a particle size corresponding to the determination. Then, the circle is counted.

In this way, from one microscope image, there are obtained: the number of the aluminum flakes included in the circles each having a diameter of 1 μm, i.e., the number of small-size aluminum flakes each having a particle size of less than or equal to 1 μm; the number of the aluminum flakes included in the circles each having a diameter of 3 μm, i.e., the number of aluminum flakes each having a particle size of more than 1 μm and less than or equal to 3 μm; the number of the aluminum flakes included in the circles each having a diameter of 5 μm, i.e., the number of aluminum flakes each having a particle size of more than 3 μm and less than or equal to 5 μm; and the number of the aluminum flakes not included in the circles each having a diameter of 5 μm, i.e., the number of aluminum flakes each having a particle size of more than 5 μm. Next, the above-described operation for counting the aluminum flakes in the microscope image are performed to all the 20 microscope images. The number of aluminum flakes of each size is summed up.

As a result, the total number of all the counted aluminum flakes and the number of the small-size aluminum flakes each having a particle size of less than or equal to 1 μm can be found, whereby the ratio of the number of the small-size aluminum flakes with respect to the number of the whole of the aluminum flakes can be calculated. In the present invention, the ratio is less than or equal to 35%.

(Uniformity Index n)

When the particle size distribution of the aluminum flakes is measured using a laser diffraction type particle size distribution measurement device, a uniformity index n based on a Rosin-Rammler diagram obtained from the above-described particle size distribution is preferably more than or equal to 2.5. Since uniformity index n is more than or equal to 2.5, it can be said that the aluminum flake pigment includes aluminum flakes having uniform particles with a very small particle size distribution, thus resulting in an increased luminance as a metallic pigment that provides a luxurious metallic feel.

In the present embodiment, the upper limit of uniformity index n of the aluminum flakes should not be limited particularly. For example, since it has been said that uniformity index n of 3.1 is production limit of aluminum flakes, it can be said that this value is the upper limit value of uniformity index n.

Here, the method of calculating uniformity index n is as described above. Examples of the laser diffraction type particle size distribution measurement device usable herein include a laser diffraction/scattering type particle size distribution measurement device (trademark: "Microtrac MT3300EXII" provided by Nikkiso). The value of uniformity index n for each of specific samples can be calculated by software bundled with the above-described device.

<<Method of Producing Aluminum Flake Pigment>>

A method of producing an aluminum flake pigment according to the present invention includes: obtaining atomized particles from pure aluminum or an aluminum alloy using an atomizing method (first step); obtaining aluminum particles by classifying the atomized particles (second step); and obtaining aluminum flakes by pulverizing the aluminum particles (third step). Accordingly, an aluminum flake pigment having a higher luminance can be produced as a metallic pigment that provides a luxurious metallic feel.

<First Step>

The first step is a step of obtaining atomized particles from pure aluminum or an aluminum alloy using the atomizing method. In the first step, specifically, the atomized particles are produced by using an open atmosphere type gas atomizing method.

First, in the first step, a molten metal of pure aluminum or an aluminum alloy serving as a source material is produced in a well-known smelting furnace. Next, by applying the open atmosphere type gas atomizing method to the molten metal in the smelting furnace, atomized particles are produced. The open atmosphere type gas atomizing method is a method of producing atomized particles by forming, using a high pressure gas, a negative pressure region in the vicinity of a nozzle attached to one end of a pipe with the other end of the pipe being soaked in the molten metal so as to suction the molten metal into the nozzle and spray the molten metal from a hole of the nozzle. The term "open atmosphere type" refers to a configuration in which the molten metal is sprayed into particles in an open atmosphere.

As the above-described high pressure gas, it is preferable to use air or inert gas such as argon, helium, and nitrogen. The pressure of the high pressure gas is preferably more than or equal to 1.0 MPa, is more preferably more than or equal to 1.5 MPa, and is most preferably more than or equal to 2.0 MPa. The upper limit value of the pressure of the high pressure gas is 10 MPa.

The above-described nozzle is preferably a nozzle having an annular shape. The size of the hole of the nozzle is preferably 2 to 2.5 mm. When the aluminum particles are obtained based on the atomized particles obtained through the first step, a volume-based average particle size (D50) thereof can be readily adjusted to more than or equal to 10 μm and less than 100 μm, preferably, more than or equal to 20 μm and less than 60 μm.

Here, the pure aluminum or aluminum alloy described above refers to an aluminum having a purity of more than or equal to 99.7 mass % (so-called "pure aluminum"), or an aluminum alloy mainly composed of aluminum (Al). Examples of the aluminum alloy include: 1000 series to 8000 series aluminum alloys; and aluminum alloys obtained by adding other elements than Al to these aluminum alloys. Preferable examples of the other elements include silicon (Si), zinc (Zn), chromium (Cr), manganese (Mn), magnesium (Mg), copper (Cu), and the like.

A blending amount of each component other than Al in each of the aluminum alloys is preferably less than or equal to 10 mass % with respect to 100 mass % of the aluminum alloy. A blending ratio of Si is preferably less than or equal to 40 mass % with respect to 100 mass % of the aluminum alloy, and a blending ratio of Mg is preferably less than or equal to 10 mass %. Each of the components included in the aluminum particle can be quantified using a high-frequency inductively-coupled-plasma (ICP) emission spectroscopy.

<Second Step>

The second step is a step of obtaining aluminum particles by classifying the atomized particles. The second step preferably includes: a step of removing fine particles from the atomized particles through, for example, dry-type air classification; and a step of removing coarse particles from the atomized particles through sieving using a predetermined sieve. Each of the steps will be described below.

(Step of Removing Fine Particles from Atomized Particles)

In the step of removing the fine particles from the atomized particles, the dry-type air classification is applied to the atomized particles obtained using the open atmosphere type gas atomizing method, thereby removing the fine particles from the atomized particles.

As a dry-type air classification method, centrifugal airflow type classification can be used. The "centrifugal airflow type classification" refers to a method of classifying atomized particles by supplying a classification chamber, in which a disc type or impeller type rotor is rotated, with an airflow (classification airflow) including the atomized particles from an outer peripheral side to an inner peripheral side in a radial direction of the rotor. The atomized particles sent into the classification chamber are classified by receiving centrifugal force provided by a rotation flow of the rotor and receiving drag force of air flowing in the radial direction of the rotor. In the centrifugal airflow classification, a classification point is determined by appropriately adjusting a rotating speed of the rotor and a flow rate of the classification airflow. For example, the classification point can be adjusted to be more than or equal to 7 μm.

Here, the classification point refers to a particle size corresponding to a point of rise in a graph of a cumulative particle size distribution of a group of classified aluminum particles when the aluminum particles are measured using a laser diffraction type particle size distribution measurement device. That is, when the classification point is 7 μm, particles each having a particle size of less than 7 μm are not theoretically detected in the classified atomized particles from which the fine particles have been removed.

(Step of Removing Coarse Particles from Atomized Particles)

In the step of removing the coarse particles from the atomized particles, a predetermined sieve is used to sieve the atomized particles from which the above-described fine particles have been removed, thereby removing coarse particles from the group of atomized particles. Accordingly, it is possible to obtain aluminum particles serving as a source material suitable for production of the aluminum flakes according to the present embodiment. Specifically, in the step of removing the coarse particles from the atomized particles, a sieve having a sieve opening of more than or equal to 40 μm and less than or equal to 75 μm can be used. In this case, the volume-based average particle size of the aluminum particles to be obtained finally can be more than or equal to 10 μm and less than 100 μm, preferably, more than or equal to 20 μm and less than 60 μm. Further, by using a blender or the like in a subsequent step, it is also possible to obtain aluminum particles having a more uniform average particle size.

(Aluminum Particles)

The aluminum particles obtained by the above-described method include small aluminum particles (hereinafter, also referred to as the "small-size aluminum particle") each having a volume-based particle size of less than or equal to 1 μm; however, a small number of the small-size aluminum particles is preferable because the aluminum particles are used to produce aluminum flakes having the ratio of the small-size aluminum flakes and uniformity index n described above. Specifically, the ratio of the number of the small-size aluminum particles is preferably less than or equal to 50% and is more preferably less than or equal to 30% with respect to the number of the whole of the aluminum particles in the microscope image when the above-described aluminum particles are observed at a magnification of 3000× using the above-described scanning electron microscope.

<Third Step>

The third step is a step of obtaining the aluminum flakes by pulverizing the aluminum particles. For the third step, a conventionally known pulverization or grinding method for obtaining aluminum flakes can be used. For example, it is preferable to use an aluminum particle pulverization or grinding method employing small-diameter steel ball grinding media each having a diameter of less than or equal to 2 mm and a ball mill. Particularly, it is more preferable to use a pulverization or grinding method employing small-diameter steel ball grinding media each having a diameter of 0.3 to 1 mm. Details of the pulverization or grinding method employing the small-diameter steel ball grinding media each having a diameter of 0.3 to 1 mm can be found in Japanese Patent No. 3954024. Accordingly, the aluminum flakes for an aluminum flake pigment that provides a luxurious metallic feel can be obtained.

<Another Step>

As another step, a required additive or the like is added to the aluminum flakes obtained through the above-described steps, whereby the aluminum flake pigment can be produced. Such an aluminum flake pigment has a higher luminance than those of the conventional ones, and can be provided as a metallic pigment that provides a luxurious metallic feel.

EXAMPLES

While the present invention will be described in more detail hereinafter with reference to Examples, the present invention is not limited thereto. A method of measuring each of the property values (the average particle size, uniformity index n, and the like) in below-described Examples and Comparative Examples is as follows.

<Volume-Based Average Particle Size (D50) and Uniformity Index n of Aluminum Particles as Well as Volume-Based Average Particle Size (D50) and Uniformity Index n of Aluminum Flakes>

First, the laser diffraction/scattering type particle size distribution measurement device (trademark: "Microtrac MT3300EXII" provided by Nikkiso) is used to introduce, into a solvent circulating in the measurement system, the aluminum particles or aluminum flakes corresponding to each of the Examples and the Comparative Examples. Next, the aluminum particles or aluminum flakes are dispersed in this circulating solvent for 180 seconds using supersonic waves, and then software bundled with the above-described device is used to measure the volume-based average particle size (D50) and uniformity index n of the aluminum particles as well as the volume-based average particle size (D50) and uniformity index n of the aluminum flakes. When targets to be measured are aluminum particles, water can be used as the circulating solvent. When targets to be measured are aluminum flakes, an alcohol solvent can be used as the circulating solvent because dispersibility of the aluminum flakes in water is low.

<Evaluation on Luminance: $L^*_{15}$ and FI Value>

A multi-angle colorimeter (trademark: "MA68II" provided by X-rite) is used to measure $L^*_{15}$ and FI value at arbitrary three locations on a painted plate prepared in a below-described manner, thereby obtaining measurement values. Next, respective average values of these obtained measurement values of the $L^*_{15}$ and the FI value based on the measurement locations are obtained, thereby calculating $L^*_{15}$ and FI value.

Example 1

1 kg of steel balls each having a diameter of 2 mm were introduced as grinding media into a cylindrical ball mill having a diameter of 500 mm and a length (height) of 200 mm. Further, 1 kg of aluminum particles having D50 and uniformity index n shown in an Example 1 of Table 1, 5.2 L of mineral spirit serving as an organic solvent, and 60 g of oleic acid serving as a grinding aid were introduced into the above-described cylindrical ball mill. The grinding was performed at a rotating speed of 26 rpm for 7 hours. Then, filtering was performed using a filter, thereby obtaining a cake including the aluminum flakes of Example 1.

Next, mineral spirit was added to the cake and they were kneaded uniformly, thereby obtaining a paste (solid content of 78%) of the aluminum flake pigment of Example 1.

Example 2 and Comparative Examples 1 and 2

The same method as that in Example 1 was used to obtain pastes of the aluminum flake pigments of an Example 2 and Comparative Examples 1 and 2 using the aluminum particles having D50 and uniformity indices n shown in Example 2 and Comparative Examples 1 and 2 of Table 1.

Figure 3:
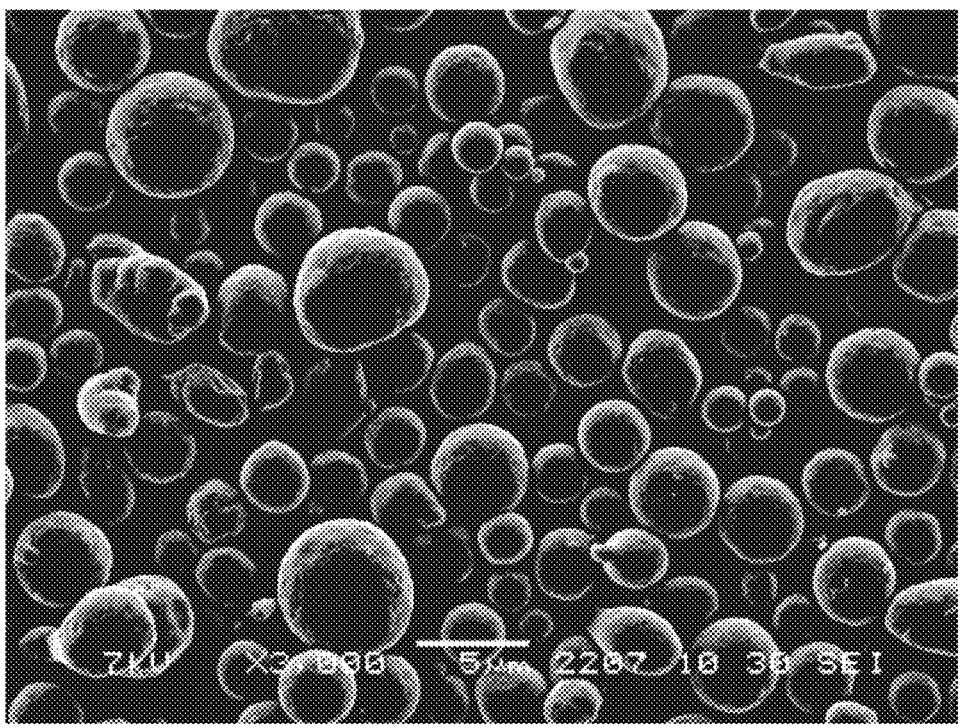
FIG. 3 shows, as an illustration, a photograph showing a scanning electron microscope image of aluminum particles serving as a source material for the aluminum flakes included in the aluminum flake pigment of Example 2.
Figure 4:
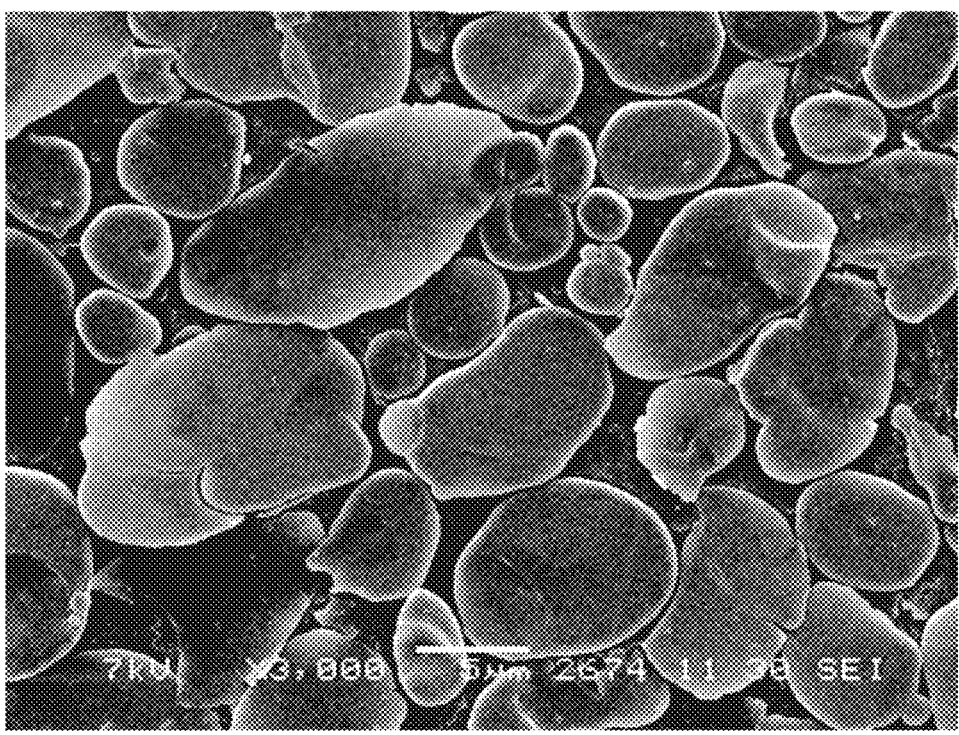
FIG. 4 shows, as an illustration, a photograph showing a scanning electron microscope image of aluminum flakes included in an aluminum flake pigment of a Comparative Example 1.
Figure 5:
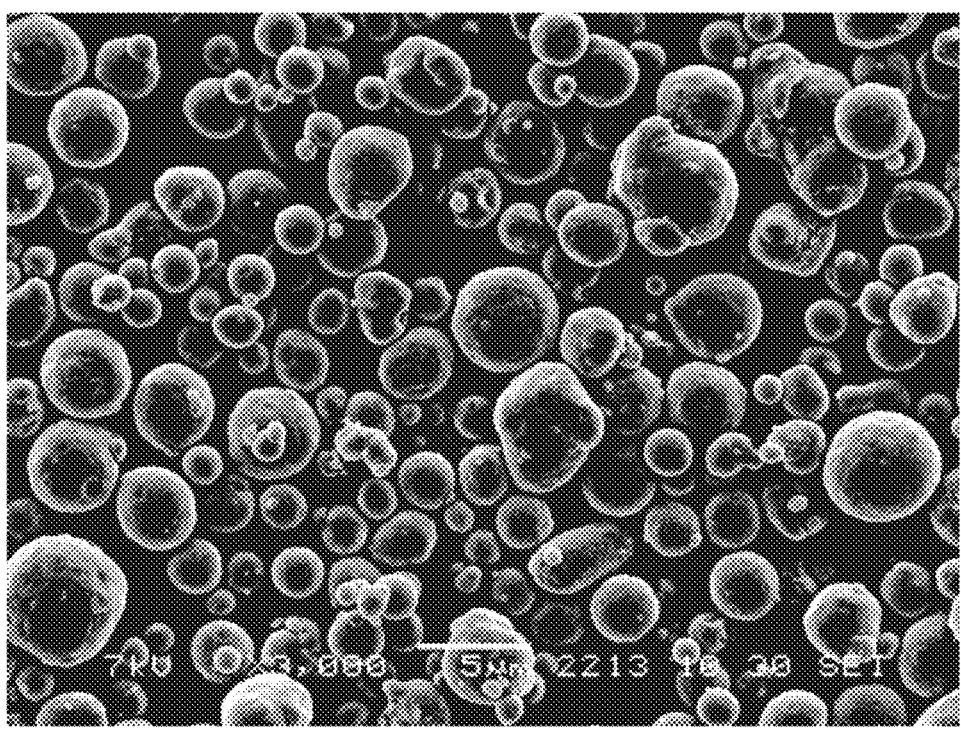
FIG. 5 shows, as an illustration, a photograph showing a scanning electron microscope image of aluminum particles serving as a source material for the aluminum flakes included in the aluminum flake pigment of Comparative Example 1.

Here, FIG. 1 shows a scanning electron microscope image of the aluminum flakes included in the aluminum flake pigment of Example 2. FIG. 3 shows a scanning electron microscope image of aluminum particles serving as a source material for the aluminum flakes included in the aluminum flake pigment of Example 2. FIG. 4 shows an electron microscope image of the aluminum flakes included in the aluminum flake pigment of Comparative Example 1. FIG. 5 shows a scanning electron microscope image of aluminum particles serving as a source material for the aluminum flakes included in the aluminum flake pigment of Comparative Example 1.

TABLE 1

|  | D50 | n |
| --- | --- | --- |
| Example 1 | 3.9 | 2.92 |
| Example 2 | 3.9 | 3.31 |
| Comparative Example 1 | 3.8 | 3.40 |
| Comparative Example 2 | 3.8 | 3.25 |

<Calculation of D50 and Uniformity Index n>

The above-described measurement device was used to calculate D50 and uniformity index n of the aluminum flakes included in each of the aluminum flake pigments of Examples 1 and 2 and Comparative Examples 1 and 2. Results thereof are shown in Table 2.

<Counting of Number of Aluminum Flakes Each Having Predetermined Particle Size>

By using a scanning electron microscope (trademark: "JSM-6380A" provided by JEOL DATUM), the number of aluminum flakes each having a predetermined particle size was counted in accordance with the above-described method in each of the aluminum flake pigments of Example 1 and 2 and Comparative Examples 1 and 2. Specifically, in each of the Examples and the Comparative Examples, the number of small-size aluminum flakes each having a particle size of less than or equal to 1 μm, the number of aluminum flakes each having a particle size of more than 1 μm and less than or equal to 3 μm, the number of aluminum flakes each having a particle size of more than 3 μm and less than or equal to 5 μm, and the number of aluminum flakes each having a particle size of more than 5 μm were counted in accordance with the above-described method.

Next, in each of the Examples and the Comparative Examples, a ratio of the number of small-size aluminum flakes each having a particle size of less than or equal to 1 μm, a ratio of the number of aluminum flakes each having a particle size of more than 1 μm and less than or equal to 3 μm, a ratio of the number of aluminum flakes each having a particle size of more than 3 μm and less than or equal to 5 μm, and a ratio of the number of aluminum flakes each having a particle size of more than 5 μm were calculated with respect to the number of the whole of the aluminum flakes. Results thereof are shown in Table 2.

TABLE 2

| | D50 | n | Less Than or Equal to 1 μm | More Than 1 μm and Less Than or Equal to 3 μm | More Than 3 μm and Less Than or Equal to 5 μm | More Than 5 μm |
|---|---|---|---|---|---|---|
| Example 1 | 11.7 | 2.53 | 22.0% | 11.3% | 16.8% | 49.9% |
| Example 2 | 12.5 | 2.59 | 22.9% | 8.0% | 12.9% | 56.3% |
| Comparative Example 1 | 11.3 | 2.57 | 38.6% | 8.3% | 13.5% | 39.6% |
| Comparative Example 2 | 13.4 | 2.37 | 56.1% | 9.7% | 5.4% | 28.8% |

<Evaluation on Luminance Using Admila Spray>

Each of the aluminum flake pigments of Examples 1 and 2 and Comparative Examples 1 and 2 was used to produce a paint in accordance with a below-described method. A luminance thereof was measured.

(Production of Base Coat Paint)

12.5 g of the paste of the aluminum flake pigment of each of the Examples and the Comparative Examples was dispersed in 12.5 g of a thinner (trademark: "nax Admila 500 standard thinner" provided by Nippon Paint), thereby obtaining a fluid dispersion. 226.2 g of nax Admila 280 adjusting clear and 37.9 g of nax Admila 901 binder (both provided by Nippon Paint) were added to this fluid dispersion, and they were then stirred using a disperser, thereby obtaining a base coat paint precursor.

Next, the base coat paint precursor was diluted using 289.1 g of the above-described nax Admila 500 standard thinner, thereby producing a base coat paint of each of the Examples and the Comparative Examples.

(Production of Topcoat Paint)

400 g of nax multi (10:1) 240·2 coat clear, 80 g of nax multi (10:1) #20·hardener, and 40 g of nax multi (10:1) #20·standard thinner (all provided by Nippon Paint) were mixed, and they were then stirred, thereby producing a topcoat paint.

(Production of Painted Plate)

The base coat paint of each of the Examples and the Comparative Examples was sprayed onto a tinplate to have a dry film thickness of 16 μm, and was then baked at 60° C. Further, the topcoat paint was applied onto this baked base coat paint to have a dry film thickness of 30 μm, and was then baked at 80° C. In this way, the painted plate of each of the Examples and the Comparative Examples was obtained.

(Measurement of $L^*_{15}$ and FI Value)

In each of the painted plates of the Examples and the Comparative Examples, $L^*_{15}$ and FI value each serving as an index for luminance were measured in accordance with the method described above. Results thereof are shown in Table 3. $L^*_{15}$ represents a luminance of front reflection. A larger value of $L^*_{15}$ indicates a higher luminance. The FI value represents an angle dependency of luminance. A larger value of the FI value indicates a greater change in reflected light depending on a visual observation angle, and provides a more metallic appearance.

TABLE 3

| | Admila Spray | |
|---|---|---|
| | $L^*_{15}$ | FI |
| Example 1 | 142.43 | 13.36 |
| Example 2 | 140.01 | 13.65 |

TABLE 3-continued

| | Admila Spray | |
|---|---|---|
| | $L^*_{15}$ | FI |
| Comparative Example 1 | 135.24 | 12.47 |
| Comparative Example 2 | 130.69 | 11.5 |

<Results and Analysis>

According to Tables 1 to 3, the ratio of the number of the small-size aluminum flakes each having a particle size of less than or equal to 1 μm in each of the aluminum flake pigments of Examples 1 and 2 was less than or equal to 25%, which was significantly lower than the ratio of more than 35% in each of the aluminum flake pigments of Comparative Examples 1 and 2. Further, each of the aluminum flake pigments of Examples 1 and 2 had uniformity index n comparable to those of the aluminum flake pigments of Comparative Examples 1 and 2, but had larger $L^*_{15}$ and FI value than those of the aluminum flake pigments of Comparative Examples 1 and 2 in the evaluations on luminances with the Admila spray. Hence, it was found that each of the aluminum flake pigments of Examples 1 and 2 had a high luminance.

It should be noted that in each of Examples 1 and 2 and Comparative Examples 1 and 2, it was also confirmed that the luminance ($L^*_{15}$ and FI value) of the aluminum flake pigment was not affected by the ratio of the number of aluminum flakes each having a particle size of more than 1 μm and less than or equal to 3 μm, the ratio of the number of aluminum flakes each having a particle size of more than 3 μm and less than or equal to 5 μm, and the ratio of the number of aluminum flakes each having a particle size of more than 5 μm.

In view of the above, it is understood that each of the aluminum flake pigments of the Examples can be provided as a metallic pigment that provides a luxurious metallic feel.

Heretofore, the embodiments and examples of the present invention have been illustrated, but it has been initially expected to appropriately combine configurations of the embodiments and examples.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. An aluminum flake pigment comprising:
aluminum flakes, wherein:
the aluminum flakes include small-size aluminum flakes each having a particle size of less than or equal to 1 µm, and
in a microscope image when the aluminum flakes are observed using a scanning electron microscope, a ratio of the number of the small-size aluminum flakes is more than or equal to 22% and less than or equal to 35% with respect to the number of a whole of the aluminum flakes, and
wherein the aluminum flake pigment exhibits an $L^*_{15}$ of more than or equal to 140 and an FI value of more than or equal to 13.

2. The aluminum flake pigment according to claim 1, wherein in the microscope image, the ratio of the number of the small-size aluminum flakes is less than or equal to 25% with respect to the number of the whole of the aluminum flakes.

3. The aluminum flake pigment according to claim 1, wherein when a particle size distribution of the aluminum flakes is measured using a laser diffraction type particle size distribution measurement device, a uniformity index n based on a Rosin-Rammler diagram obtained from the particle size distribution is more than or equal to 2.5.

4. A method of producing the aluminum flake pigment recited in claim 1, the method comprising:
obtaining atomized particles from pure aluminum or an aluminum alloy using an atomizing method;
obtaining aluminum particles by classifying the atomized particles; and
obtaining aluminum flakes by pulverizing the aluminum particles.

* * * * *